US007839017B2

(12) United States Patent
Huizenga et al.

(10) Patent No.: US 7,839,017 B2
(45) Date of Patent: Nov. 23, 2010

(54) SYSTEMS AND METHODS FOR REMOTELY CONTROLLING AN ELECTRICAL LOAD

(75) Inventors: Charles Huizenga, Berkeley, CA (US); Michael Corr, San Francisco, CA (US)

(73) Assignee: Adura Technologies, Inc., San Francisco, CA (US)

( * ) Notice: Subject to any disclaimer, the term of this patent is extended or adjusted under 35 U.S.C. 154(b) by 31 days.

(21) Appl. No.: 12/380,727

(22) Filed: Mar. 2, 2009

(65) Prior Publication Data

US 2010/0134051 A1 Jun. 3, 2010

(51) Int. Cl.
*H02J 3/14* (2006.01)

(52) U.S. Cl. ........................................................ 307/38

(58) Field of Classification Search ....... 307/10.1–10.8, 307/38, 112–140; 701/2

See application file for complete search history.

(56) References Cited

U.S. PATENT DOCUMENTS

| | | | |
|---|---|---|---|
| 4,323,820 A | | 4/1982 | Teich |
| 4,355,309 A | | 10/1982 | Hughey et al. |
| 4,358,717 A | | 11/1982 | Elliott |
| 4,454,509 A | | 6/1984 | Buennagel et al. |
| 4,686,380 A | | 8/1987 | Angott |
| 4,797,599 A | | 1/1989 | Ference et al. |
| 5,005,211 A | | 4/1991 | Yuhasz |
| 5,146,153 A | | 9/1992 | Luchaco et al. |
| 5,237,264 A | | 8/1993 | Moeley et al. |
| 5,248,919 A | | 9/1993 | Hanna et al. |
| 5,357,170 A | | 10/1994 | Luchaco et al. |
| 5,373,453 A | | 12/1994 | Bae |
| 5,471,063 A | | 11/1995 | Hayes et al. |
| 5,561,351 A | | 10/1996 | Vrionis et al. |
| 5,572,438 A | | 11/1996 | Ehlers et al. |
| 5,637,930 A | | 6/1997 | Rowen et al. |
| 5,770,926 A | | 6/1998 | Choi et al. |
| 5,872,429 A | | 2/1999 | Xia et al. |
| 5,905,442 A | | 5/1999 | Mosebrook et al. |
| 5,909,087 A | | 6/1999 | Bryde et al. |
| 5,962,989 A | | 10/1999 | Baker |
| 5,982,103 A | | 11/1999 | Mosebrook et al. |
| 6,025,783 A | * | 2/2000 | Steffens, Jr. ................ 340/644 |
| 6,044,062 A | | 3/2000 | Brownrigg et al. |
| 6,100,653 A | | 8/2000 | Lovell et al. |
| 6,169,377 B1 | | 1/2001 | Bryde et al. |
| 6,184,622 B1 | | 2/2001 | Lovell et al. |
| 6,249,516 B1 | | 6/2001 | Brownrigg et al. |
| 6,252,358 B1 | | 6/2001 | Xydis et al. |
| 6,297,724 B1 | | 10/2001 | Bryans et al. |
| 6,300,727 B1 | | 10/2001 | Bryde et al. |
| 6,301,674 B1 | | 10/2001 | Saito et al. |
| 6,311,105 B1 | | 10/2001 | Budike |
| 6,388,399 B1 | | 5/2002 | Eckel et al. |

(Continued)

*Primary Examiner*—Albert W Paladini
(74) *Attorney, Agent, or Firm*—Carr & Ferrell LLP

(57) ABSTRACT

Systems and methods for remotely controlling an electrical load are provided. A switch is associated with controlling one or more electricity-consuming devices. After electrically isolating the switch from the electricity-consuming device, an adapter is communicatively coupled to and used to detect the state of the switch. The adapter generates and wirelessly transmits a signal indicative of the detected state of the switch to a controller that controls operation of the device based on at least the state of the switch as detected by the sensor and indicated by the wirelessly transmitted signal.

19 Claims, 5 Drawing Sheets

U.S. PATENT DOCUMENTS

| | | | |
|---|---|---|---|
| 6,400,280 | B1 | 6/2002 | Osakabe |
| 6,504,266 | B1 | 1/2003 | Ervin |
| 6,535,859 | B1 | 3/2003 | Yablonowski |
| 6,633,823 | B2 | 10/2003 | Bartone et al. |
| 6,689,050 | B1 | 2/2004 | Beutter et al. |
| 6,700,334 | B2 | 3/2004 | Weng |
| 6,803,728 | B2 | 10/2004 | Balasubramaniam et al. |
| 6,891,838 | B1 | 5/2005 | Petite et al. |
| 6,904,385 | B1 | 6/2005 | Budike, Jr. |
| 6,914,395 | B2 | 7/2005 | Yamauchi et al. |
| 6,914,893 | B2 | 7/2005 | Petite |
| 6,927,546 | B2 | 8/2005 | Adamson et al. |
| 6,990,394 | B2 | 1/2006 | Pasternak |
| 7,006,768 | B1 | 2/2006 | Franklin |
| 7,039,532 | B2 | 5/2006 | Hunter |
| 7,042,170 | B2 | 5/2006 | Vakil et al. |
| 7,045,968 | B1 | 5/2006 | Bierman et al. |
| 7,054,271 | B2 | 5/2006 | Brownrigg et al. |
| 7,079,808 | B2 | 7/2006 | Striemer |
| 7,103,511 | B2 | 9/2006 | Petite |
| 7,167,777 | B2 | 1/2007 | Budike, Jr. |
| 7,199,530 | B2 | 4/2007 | Vakil et al. |
| 7,233,080 | B2 * | 6/2007 | Garnault et al. ............ 307/10.2 |
| 7,263,073 | B2 | 8/2007 | Petite et al. |
| 7,274,975 | B2 | 9/2007 | Miller |
| 7,307,389 | B2 | 12/2007 | Vakil et al. |
| 7,307,542 | B1 | 12/2007 | Chandler et al. |
| 7,333,880 | B2 | 2/2008 | Brewster et al. |
| 7,346,433 | B2 | 3/2008 | Budike |
| 7,349,766 | B2 | 3/2008 | Rodgers |
| 7,352,972 | B2 | 4/2008 | Franklin |
| 7,354,175 | B2 | 4/2008 | Culbert et al. |
| 7,369,060 | B2 | 5/2008 | Veskovic et al. |
| 7,400,226 | B2 | 7/2008 | Barrieau et al. |
| 7,490,957 | B2 | 2/2009 | Leong et al. |
| 7,491,111 | B2 * | 2/2009 | Ghaly ........................ 446/436 |
| 7,528,503 | B2 | 5/2009 | Rognli et al. |
| 7,561,977 | B2 | 7/2009 | Horst et al. |
| 7,565,227 | B2 | 7/2009 | Richard et al. |
| 7,571,063 | B2 | 8/2009 | Howell et al. |
| 7,599,764 | B2 * | 10/2009 | Matsuura et al. ............... 701/2 |
| 7,606,639 | B2 | 10/2009 | Miyaji |
| 7,623,042 | B2 | 11/2009 | Huizenga |
| 7,650,425 | B2 | 1/2010 | Davis et al. |
| 2001/0025349 | A1 | 9/2001 | Sharood et al. |
| 2002/0043938 | A1 | 4/2002 | Lys |
| 2003/0020595 | A1 | 1/2003 | Wacyk |
| 2003/0209999 | A1 | 11/2003 | Hui et al. |
| 2004/0002792 | A1 | 1/2004 | Hoffknecht |
| 2004/0051467 | A1 | 3/2004 | Balasubramaniam et al. |
| 2004/0100394 | A1 | 5/2004 | Hitt |
| 2005/0043862 | A1 | 2/2005 | Brickfield et al. |
| 2005/0234600 | A1 | 10/2005 | Boucher et al. |
| 2006/0044152 | A1 | 3/2006 | Wang |
| 2006/0142900 | A1 | 6/2006 | Rothman et al. |
| 2006/0215345 | A1 | 9/2006 | Huizenga |
| 2007/0005195 | A1 | 1/2007 | Pasquale et al. |
| 2007/0085700 | A1 | 4/2007 | Walters et al. |
| 2007/0090960 | A1 | 4/2007 | Miki |
| 2007/0271006 | A1 | 11/2007 | Golden et al. |
| 2007/0273307 | A1 | 11/2007 | Westrick et al. |
| 2007/0276547 | A1 | 11/2007 | Miller |
| 2008/0133065 | A1 | 6/2008 | Cannon et al. |
| 2008/0167756 | A1 | 7/2008 | Golden et al. |
| 2008/0281473 | A1 | 11/2008 | Pitt |
| 2009/0026966 | A1 | 1/2009 | Budde et al. |
| 2009/0055032 | A1 | 2/2009 | Rodgers |
| 2009/0063257 | A1 | 3/2009 | Zak et al. |
| 2009/0066473 | A1 | 3/2009 | Simons |
| 2009/0132070 | A1 | 5/2009 | Ebrom et al. |
| 2009/0198384 | A1 | 8/2009 | Ahn |
| 2009/0240381 | A1 | 9/2009 | Lane |
| 2009/0243517 | A1 | 10/2009 | Verfuerth et al. |
| 2009/0267540 | A1 | 10/2009 | Chemel et al. |
| 2009/0292402 | A1 | 11/2009 | Cruickshank |
| 2009/0292403 | A1 | 11/2009 | Howell et al. |
| 2009/0299527 | A1 | 12/2009 | Huizenga |
| 2010/0185339 | A1 | 7/2010 | Huizenga et al. |

* cited by examiner

SYSTEMS AND METHODS FOR REMOTELY CONTROLLING AN ELECTRICAL LOAD

CROSS-REFERENCE TO RELATED APPLICATIONS

The present application is related to U.S. patent application Ser. No. 12/156,621 filed Jun. 2, 2008, which is entitled "Distributed Intelligence in Lighting Control," the disclosure of which is incorporated herein by reference.

BACKGROUND OF THE INVENTION

1. Field of the Invention

The present invention generally relates to electrical infrastructure technology. More specifically, the present invention relates to remotely controlling an electrical load.

2. Description of Related Art

Traditionally, electrical loads (e.g., of lighting fixtures and other electricity-consuming appliances) in commercial and residential settings are controlled by wired switches. Switches, or actuators, may vary in number of fixtures/appliances controlled, degree of control, physical form, and mount type. In general, however, these wired switches are manually regulated in the vicinity of a corresponding electrical load. Thus, a highly localized control solution may result in which electrical loads are controlled at usage locations.

Highly localized control solutions may become difficult to maintain and operate in larger installations, particularly where energy conservation is a concern. For instance, in some buildings, each light switch may need to be located and switched off. As such, building occupants may be required to micromanage these light switches, and such occupants may, for example, forget to switch off one or more light switches when they leave the office building.

In contrast, highly centralized control solutions may allow the electrical loads of a particular installation to be controlled by a single control interface. The control interface may be accessible, for example, to a facilities manager of the particular installation. Such highly centralized control solutions may be complex and costly to install or retrofit. Further, consequences of high centralization may include inflexibility and inability to respond to local dynamic conditions. Fluctuations in occupancy of certain building areas, natural lighting levels, and differences in occupant lighting preferences, for example, may require local adjustments, which may not be possible or easily achieved in highly centralized systems.

Wireless control solutions may possess advantages of both localized and centralized control solutions by providing control of electrical loads locally and centrally. Implementing such wireless solutions, however, may include installing new wireless systems into new buildings. Alternatively, buildings with existing wired systems may need to be retrofitted for wireless control. Completely retrofitting a building may involve replacing wired switches with new devices that can transmit wireless signals. A problem with such a solution is that users may be accustomed to wired switches and may therefore be uncomfortable with dramatic changes.

There is therefore a need in the art for improved systems and methods for wireless control of such electrical loads.

SUMMARY OF THE INVENTION

The presently claimed invention provides systems and methods for remotely controlling electrical loads to electricity-consuming devices. In some embodiments of the present invention, such systems may include an adapter configured to couple to a switch. The switch may be a pre-existing wired wall switch. The adaptor may include a sensor configured to detect a state of the switch such as an 'on' position, an 'off' position, and, for light fixtures, positions indicative of one or more levels of dimness. The switch may be electrically isolated from the electricity-consuming device. The adaptor may further include a communications interface configured to wirelessly transmit a signal indicative of the detected state of the switch to a controller. Such a controller may be configured to control the electrical load provided to the device based on at least the state of the switch as detected by the sensor and indicated by the wirelessly transmitted signal. A power unit configured to provide power to the sensor and the communications interface may also be included in the adaptor.

Some embodiments provide methods for remotely controlling an electrical load provided to an electricity-consuming device. These methods may include detecting a state of a switch electrically isolated from the device. Detecting the state of the switch may include detecting an interrupt signal. A wireless signal indicative of the state of the switch may be transmitted from a transmitter to a controller. As mentioned, the controller may control the electrical load provided to the device based on at least the state of the switch indicated by the signal. Controlling the electrical load may allow for turning on, turning off, and/or dimming one or more lighting fixtures.

Further embodiments of the present invention include methods for adapting a pre-existing switch for remote control of an electrical load. These methods may include electrically isolating the pre-existing switch from the electricity-consuming device, communicatively coupling an adapter to the pre-existing switch, and configuring the adapter to detect a state of the pre-existing switch and to transmit a signal indicative of the state to a controller that may control the electrical load provided to the device based on at least the state indicated by the signal. Electrically isolating the pre-existing switch may include shorting a switched line previously associated with the pre-existing switch such that power is continuously available for the controller to provide to the device. Configuring the adapter may include connecting a low voltage signal from the power source of the adapter to a line terminal of the pre-existing switch and connecting a sensor from the adapter to a load terminal of the pre-existing switch.

Embodiments of the present invention may further include computer-readable storage media having embodied thereon programs that, when executed by a computer processor device, perform methods associated with adapting wall controllers and switches.

DETAILED DESCRIPTION

The presently claimed invention provides systems and methods for remotely controlling electrical loads and adapting pre-existing switches for such remote control. Such systems and methods may allow pre-existing, wired switches to be compatible with wireless control systems. An adapter may be installed in a switchbox alongside a pre-existing switch. The adapter may detect a state of the switch (e.g., 'on' or 'off') and transmit a signal indicative of that state to a controller associated with a device. The controller may control the electrical load of the device based on at least the state of the switch as indicated by the signal. Exemplary embodiments of the present invention are provided for illustrative purposes and should not be construed as a limitation on the presently claimed invention, which may be applied to any system including a switched electrical load.

Figure 1:
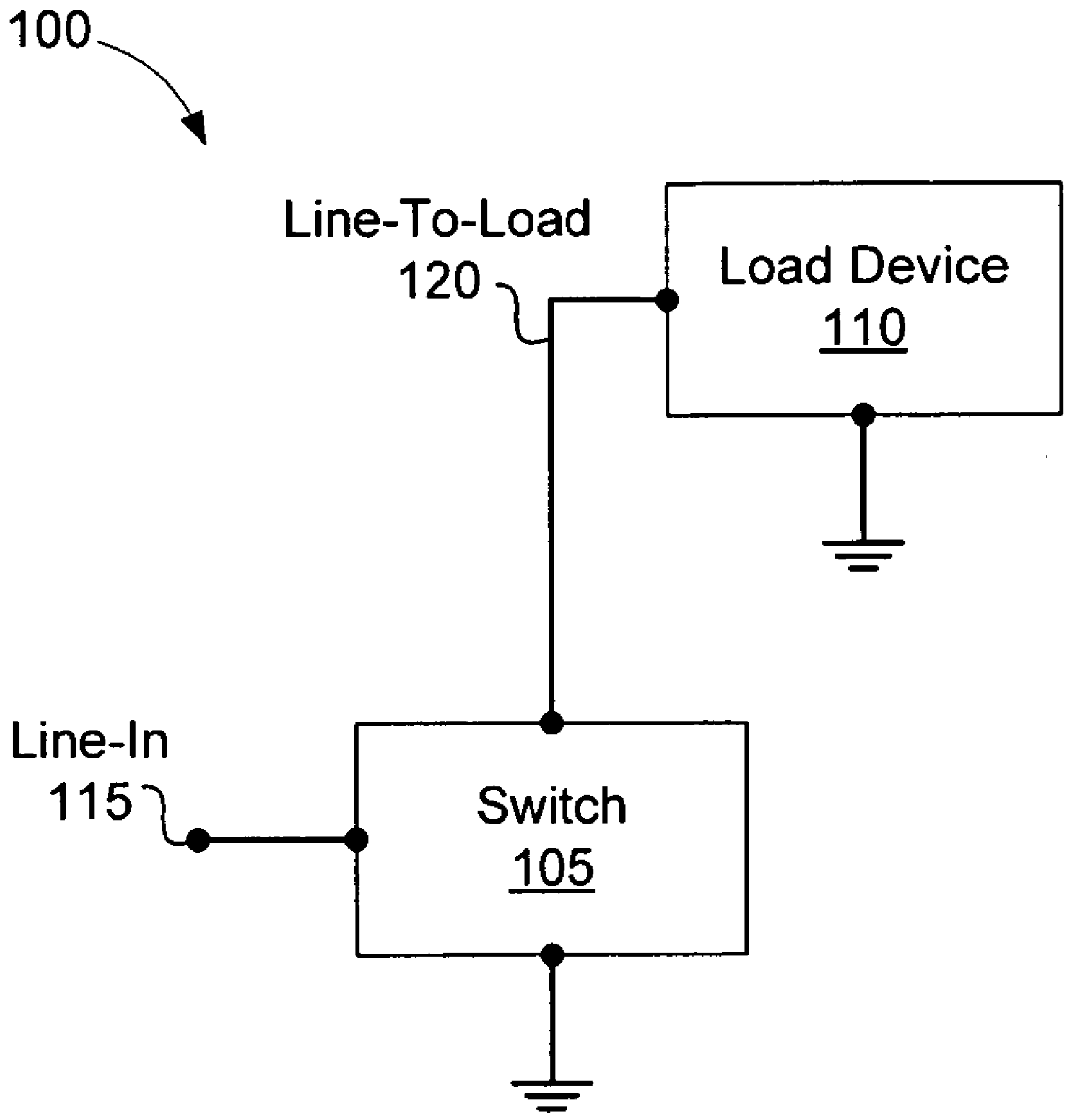
FIG. 1 (Prior Art)
FIG. 1 is a wiring diagram for circuitry including a switched electrical load according to prior art.

FIG. 1 is a wiring diagram 100 for circuitry including a switched electrical load according to the prior art. The wiring diagram 100 includes a switch 105 used to control electric load provided to device 110. Electrical power is provided by a line-in 115. The switch 105 may control the device 110 by electrically connect and disconnect the line-in 115 to a line-to-load 120. When the line-in 115 is connected to the line-to-load 120, power is provided from the line-in 115 to the device 110 via the line-to-load 120. When the line-in 115 is disconnected from the line-to-load 120, power is not provided from the line-in 115 to the device 110. The line-in 115 may provide a number of different voltages such as 120/277 VAC or 24 VAC/VDC. Although wiring diagram 100 depicts a 2-way switched electrical load, those skilled in the art will appreciate that the concepts and principles discussed herein may be applied to other traditional, wired circuitry such as multi-way switched electrical loads (e.g., 3-way switched loads).

The switch 105 may be any device that may be used to interrupt an electrical circuit or vary the power transferred via the electrical circuit based on user input. Manually operated switches, for example, allow for electrical circuit control based on physical manipulation by a user. Examples of such include a toggle switch, a rocker switch, a push-button switch, a momentary contact switch, etc. Such a switch 105 may have one or more sets of electrical contacts or terminals (not depicted). While manually operated switches may presently be most common, switch 105 may further include touchpads, virtual switches, graphic user interfaces, or combinations of the foregoing.

Binary switches include a line-in terminal and line-to-load terminal and may be in one of two states. These states include 'open' and 'closed,' which correspond to the switch 105 states of 'off' or 'on,' respectively. In the 'open' state, the terminals are disconnected such that electricity cannot flow between the terminals, and no electricity may be provided to any device. Conversely, in the 'closed' state, the terminals are connected such that electricity can flow between the terminals in the closed-state, and electricity may be provided to one or more devices.

Alternatively, the switch 105 may include a dimmer switch or another variable voltage device by which variable power may be supplied to the device 110 based on a setting of the switch 105. Accordingly, intermediate states between on and off may be attributed to the switch 105. For example, the state could be '50% power,' where off-state and on-state correspond to '0% power' and '100% power,' respectively. Although dimmer switches are generally associated with lighting fixtures, other variable voltage devices may be associated with other electricity-consuming appliances having multiple operational settings (e.g., fans).

The load device 110 illustrated in FIG. 1 may represent one or more electricity-consuming appliances. For example, the device 110 may be an individual lighting fixture or a cluster of lighting fixtures. The device 110 may also include heating, ventilating, air-conditioning (HVAC) systems, fans, blinds, louvers, security systems, fire and life safety systems, irrigation systems, etc.

Figure 2:
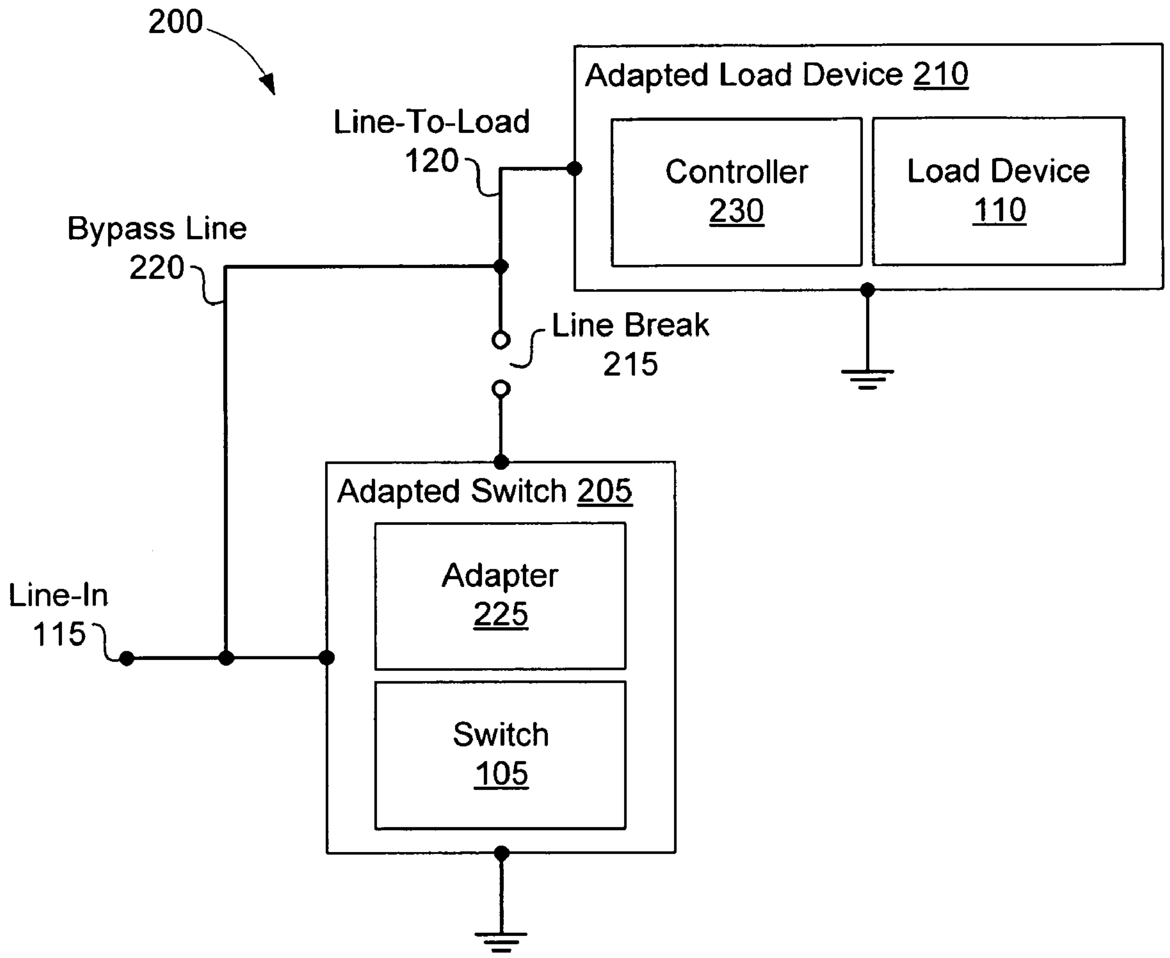
FIG. 2 is a wiring diagram for circuitry including a remotely controlled electrical load according to an embodiment of the present invention.

FIG. 2 is an exemplary wiring diagram 200 for circuitry including a remotely controlled electrical load according to an embodiment of the present invention. The wiring diagram 200 includes an adapted switch 205 and an adapted device 210. The adapted switch 205 is not connected to the line-to-load 120, as illustrated by the line break 215. Instead, the line-in 115 is connected directly to the line-to-load 120. For example, a bypass line 220 may be provided to connect the line-in 115 directly to the line-to-load 120. Bypass line 220 and line break 215 may be included within the same switch box that may house the adapted switch 205. Although wiring diagram 200 depicts a 2-way switched electrical load configuration, those skilled in the art will appreciate that the concepts and principles discussed herein may be applied to more complex circuitry such as multi-way switched electrical loads (e.g., 3-way switched loads).

As depicted, the adapted switch 205 includes an adapter 225 and the switch 105. In alternative embodiments, the adapted switch 205 may include a device that incorporates features of both the adapter 225 and the switch 105 described herein. The adapter 225 is communicatively coupled to switch 105 and may be mounted to, or proximate to, the switch 105. The adapter 225, or elements thereof, is configured to detect a state of the switch 105 (e.g., on, off, or some intermediate state), generate a signal indicative of the detected state, and wirelessly transmit the signal to the adapted load device 210. The adapter 225 is described in further detail in connection with FIG. 3.

The adapted load device 210 includes a controller 230 associated with the load device 110 as depicted in FIG. 2. In such an embodiment, the controller 230 may be disposed in the line-to-load 120 just prior to the load device 110. Alternatively, the controller 230 may be integrated with the load device 110 as a single unit. For example, the controller 230 may be contained within a ballast of a lighting fixture.

The controller 230 is configured to control the load device 110 based on at least the state of the switch 105 as indicated by the signal transmitted by the adapter 225. Controlling the load device 110 may be accomplished by controlling the electricity provided or not provided to the load device 110. For example, the controller 230 may be configured to control dimming operations of a light fixture.

In some embodiments, controller 230 may encompass various apparatuses described in related U.S. patent application Ser. No. 12/156,621, the disclosure of which is incorporated by reference herein. Controller 230 may include a microcontroller or microprocessor-based computing platform designed to perform a specific task or set of tasks (not depicted) and a communications interface (not depicted). Rule-based or algorithmic actuation logic executed by the microcontroller may make control decisions to actuate the load device 110 to a certain state or level based on the information provided to the controller 230. Besides the signals transmitted from the adapter 225, the controller 230 may control load device 110 based on time of day, occupancy information, schedules, natural light levels, signals from a centralized control system, automated signals from the utility or other entity (e.g., demand response), etc. In some embodiments, elements of the controller 230 may track date and time internally such that time-based operations may be performed. Operating schedule information, (e.g., holiday information) and desired operating states may be communicated to and stored in the controller 230 such that the controller 230 may run autonomously.

The communications interface (not depicted) of the controller 230 may provide relevant information for configuration and decision making to elements of the controller 230. The communications interface may allow the controller 230 to receive information or signals from various sources such as light and other switches (e.g., the adapted switch 205), sensors (e.g., light level, occupancy, or switch-state sensors), and network gateways that provide input from a centralized control system. Additionally, the controller 230 may provide information to the centralized control system regarding failed equipment (e.g., lamps or ballasts) based on the state of the load device 110 and the state of the switch 105.

Figure 3:
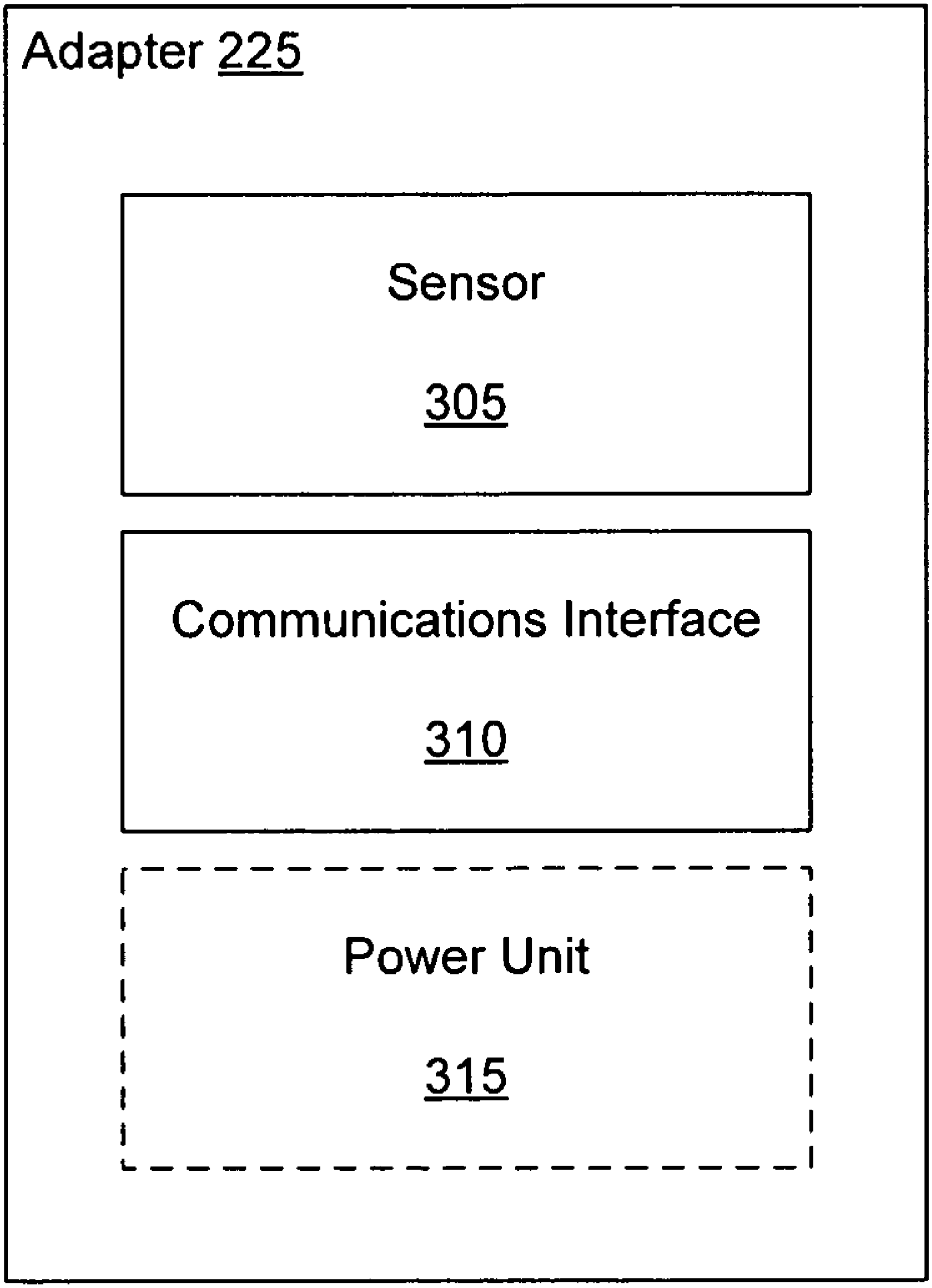
FIG. 3 is a block diagram of an exemplary adapter.

FIG. 3 is a block diagram of an exemplary adapter 225. As depicted, the adapter 225 includes a sensor 305, a communications interface 310, and a power unit 315. The connections included in the adapter 225 may include standard terminations such as those found on typical lighting switches (e.g., screw terminals, insert connections). A blank cover plate may be installed on a switchbox housing the adapter 225 for concealment in some embodiments. Furthermore, the adapter 225 may further include a mechanical switch (not shown) to interrupt power supplied to the adapted load device 210 (e.g., for maintenance purposes).

The sensor 305 is configured to detect a state of the switch 105. As mentioned previously, the switch 105 may be electrically isolated from the adapted load device 210, such that physical manipulation of the switch does not affect the electrical load with respect to load device 110. In 2-way switched electrical load configurations, for example, the state of the switch 105 may be detected by the sensor 305 by connecting a low voltage signal to the line-in terminal of the switch 105 and a digital sensor to the corresponding line-to-load terminal of the switch 105. This allows the position of the switch to be detected using an interrupt signal, while requiring very little power. Depending on the type of switch, sensor 305 may also detect the state of switch 105 based on on motion detection, touch detection, etc.

The communications interface 310 may be configured to generate and wirelessly transmit a signal indicative of the detected state of the switch 105 to controller 230. The controller 230 may then control the load device 110 based on the signal. For example, if the sensor 305 senses or detects that the state of the switch 105 is changed from ‘off’ to ‘on,’ the communications interface 310 may generate and wirelessly transmit a signal to the controller 230 that indicates the current state of the switch 105. Accordingly, the controller 230 may turn the load device 110 on. In some embodiments, the communications interface 310 may include a radio transmitter or antenna to transmit signals to controller 230. Alternatively, an external antenna may be integrated into a wall cover plate or a photovoltaic insert associated with the adapted switch 205.

The power unit 315 may be configured to provide power to the sensor 305 and the communications interface 310. The power unit 315 may take on several forms in accordance with various embodiments. For example, a battery (e.g., lithium, alkaline) may be included in the power unit 315 to provide power to the sensor 305 and the communications interface 310. In other embodiments, a capacitor capable of storing energy for a specified time span (e.g., several days) may be included in the power unit 315. A current transformer, AC/DC power converter, or other means of obtaining power from the line-in 115 may be used to charge the battery or capacitor when power is supplied to the load device 110.

The power unit 315 may further include a photovoltaic cell (not shown) configured to harvest light energy. The photovoltaic cell may directly power the sensor 305 and the communications interface 310. Alternatively, the photovoltaic cell may charge a battery or capacitor included in the power unit 315. The photovoltaic cell may be mounted on a wall cover plate that covers a switchbox that houses the adapted switch 205. For example, when a single switch is replaced in a 2-gang switchbox, the photovoltaic cell may be mounted in one switch position so as to protrude through a standard decorator cover plate.

In some embodiments, the power unit 315 may include an AC/DC power converter. Alternating current supplied by the line-in 115 to the AC/DC power converter may be converted to a direct current at an appropriate voltage for the sensor 305 and the communications interface 315. For example, where a low voltage is supplied by the line-in 115, the AC/DC converter may be capable of converting the low voltage (e.g., 16 to 24 VAC) to the appropriate voltage (e.g., approximately 3 VDC) as may be required by the sensor 305 and the communications interface 310.

The adapter 225 may include other elements for mounting the adapter 225 proximate to the switch 105. In some embodiments, the adapter 225 may mount to the rear of the switch 105 using metal lugs that connect to terminals of the switch 105. In other embodiments, wire (e.g., 14 AWG) may be inserted into rear-wiring connecters of the switch 105 in order to mount the adapter 225.

Figure 4:
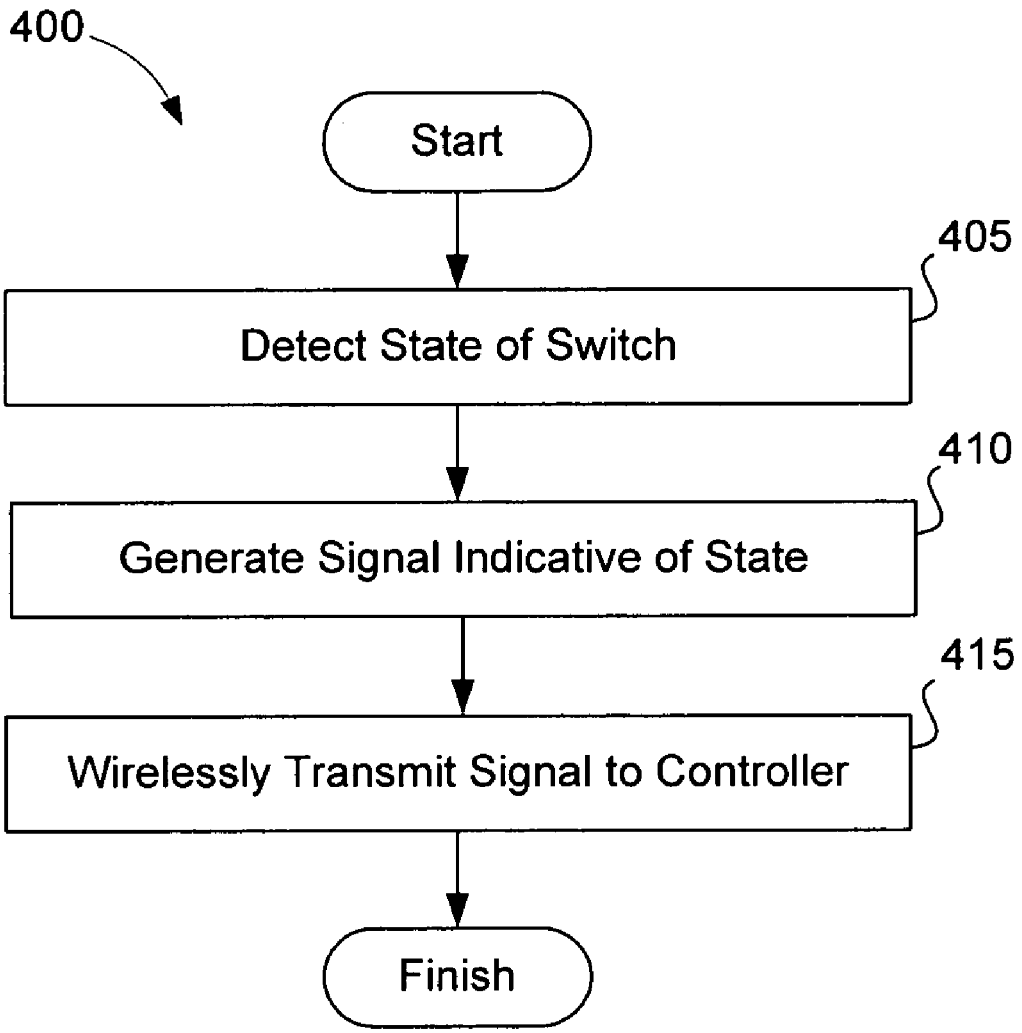
FIG. 4 is a flowchart illustrating an exemplary method for remotely controlling an electrical load.

FIG. 4 is a flowchart illustrating an exemplary method 400 for remotely controlling an electrical load (e.g., load device 110). In method 400, a state of switch 105 is detected, a signal is generated based on the detected state, and the signal is wirelessly transmitted to controller 230 associated with load device 110. Controller 230 may control the operation of load device 110 based on the state of switch 105 as indicated by the received signal.

In step 405, a state of switch 105 is detected. Switch 105 has been electrically isolated from the electrical load device 110, which may be a lighting fixture or any other electricity-consuming appliance. The electrical isolation of switches is discussed further in connection with FIG. 5. The state of switch 105 is detected by sensor 305. For some switches, detecting the state of the switch may include detecting an interrupt signal. For example, the state of the switch may be detected when a low voltage signal is connected to a line-in terminal of the switch by connecting a digital sensor connected to a corresponding line-to-load terminal of the switch.

The state of the switch detected by sensor 305 may be ‘on,’ ‘off,’ or some intermediate state (e.g., 50% power). Sensor 305 may further detect when the switch is pressed and held for a certain period of time. In some embodiments, such a hold may indicate a request for a type of control (i.e., a request for maximum light power).

In step 410, a signal indicative of the state of switch 105 is generated by communications interface 310. As noted previously, switch 105 has been electrically isolated from device 110. As such, manipulation, physical or otherwise, of switch 105 no longer interrupts/connects the flow of electricity of device 110, which is under the control of controller 230. For user input received at switch 105 to affect operation of device 110, such input may be provided to controller 230 as a signal.

In step 415, the signal generated in step 410 is wirelessly transmitted to controller 230 from the communications interface 310. Controller 230 may control operation of device 110 based on the signal (e.g., turning on or turning off a lighting fixture or other electricity-consuming appliance). Controlling the electrical load may further include dimming a lighting fixture or setting the electricity-consuming appliance to a variable setting.

Where there are multiple points of control (e.g., multiple light bulbs), controller 230 may exercise individualized control over each point. For example, controller 230 may be associated with a cluster of light fixtures in a room. In such an example, adapter 225 may be coupled to a toggle switch, detected one or two toggles, generated and wirelessly transmitted a signal to controller 230 indicative of such. In response, controller 230 may provide electricity to and thereby turn on only one or two of the fixtures.

Figure 5:
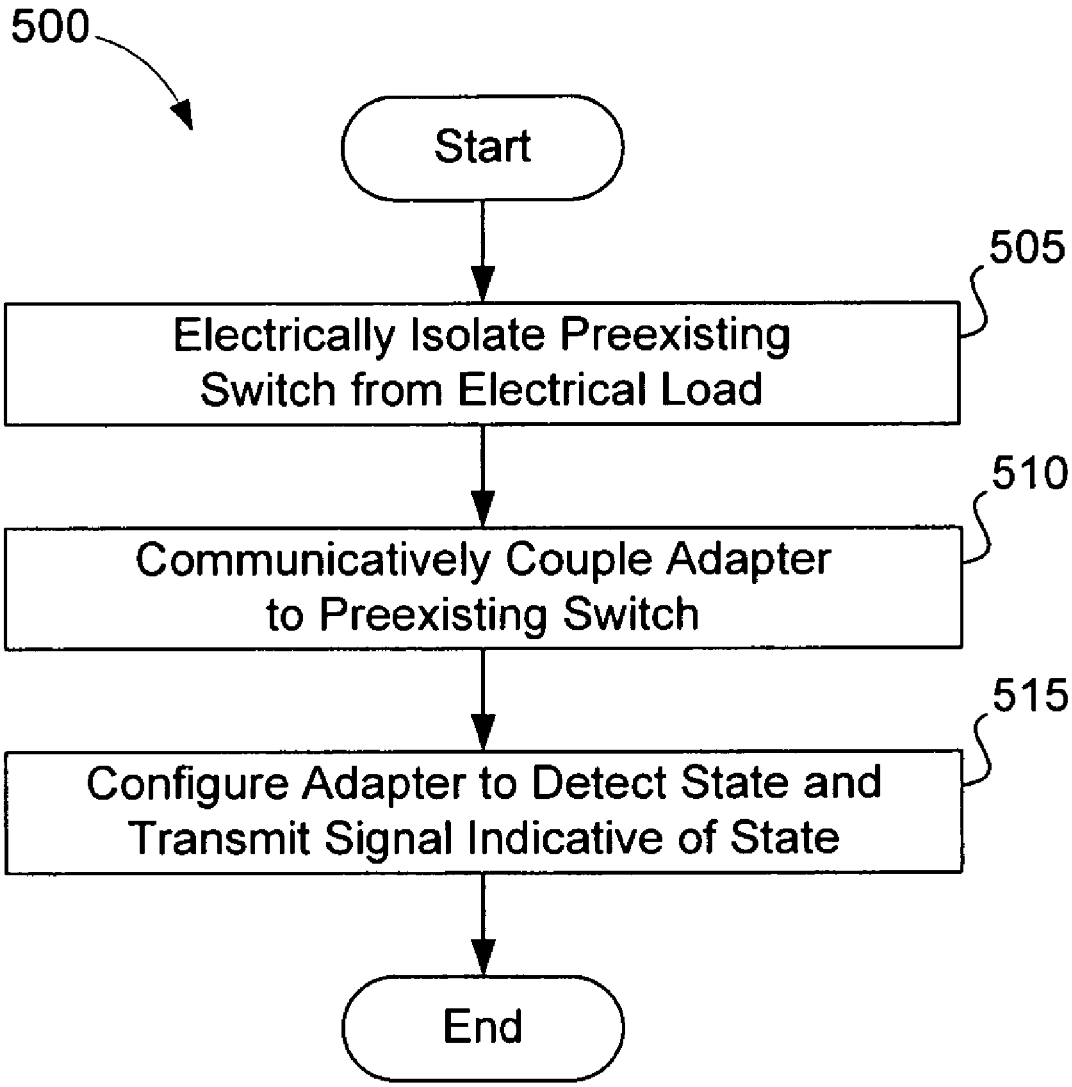
FIG. 5 is a flowchart illustrating an exemplary method for adapting a pre-existing switch for remote control of an electrical load.

FIG. 5 is a flowchart illustrating an exemplary method 500 for adapting a switch for remote control of an electrical load. In method 500, switch 105 is electrically isolated from load device 110, adapter 225 is coupled to switch 105, and adapter 225 is configured to detect a state (or change to a state) of switch 105 and to generate and wirelessly transmit a signal indicative of the state to controller 230.

In step 505, the switch 105 is electrically isolated from device 110. This step may be performed in various manners depending on specific circuitry and circuit elements. As illustrated in FIG. 2, a line break 215 in the line-to-load 120 may be used to electrically isolate the switch 105 from the load 110. Electrical isolation may be achieved by disconnecting any line connecting the switch 105 to a corresponding load device 110 and/or shorting a switched line previously associated with switch 105 such that power is continuously supplied to the electrical load. A bypass line 220 may be provided, thereby connecting the line-in 115 to the line-to-load 120 such that power is continuously provided to the adapted load device 210 (i.e., load device 110 under control of controller 230).

As previously described, switch 105 may include a line-in terminal that connects to the line-in 115 and a line-to-load terminal that connects to the line-to-load 120. Step 505 may include disconnecting the line-to-load 120 from the line-to-load terminal and connecting the line-to-load 120 to the line-in terminal, thereby shorting the line-in 115 to the adapted load 210.

In step 510, an adapter 225 is communicatively coupled to switch 105. In some embodiments, the adapter may be mounted to the rear of switch 105 using metal lugs that connect to terminals of switch 105. Alternatively, wire (e.g., 14 AWG) may be inserted into rear-wiring connecters of switch 105 in order to mount the adapter 225.

In step 515, the adapter 225 is configured to detect a state of switch 105 and to generate and wirelessly transmit a signal indicative of the state to controller 230, which controls the electrical load based on at least the state of switch 105 indicated by the signal. Configuring the adapter 225 may include connecting a low voltage signal from a power unit 315 of the adapter 225 to a line-in terminal of switch 105. Additionally, a sensor 305 may be connected from the adapter 225 to a line-to-load terminal of the switch 105.

The terms "computer-readable storage medium" and "computer-readable storage media" as used herein refer to a medium or media that participates in providing instructions to a CPU for execution. Such media can take many forms including, but not limited to, non-volatile and volatile media. Non-volatile media include, for example, optical or magnetic disks, such as a fixed disk. Volatile media include dynamic memory, such as system RAM. Common forms of computer-readable storage media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments.

To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A system for remotely controlling one or more electricity consuming appliances, the system comprising:

an adapter configured to couple to a switch associated with controlling the one or more electricity consuming appliances, wherein a state of the switch is associated with an operational status of the one or more electricity consuming appliances, the adaptor comprising:

a sensor configured to detect a state of the switch, the switch having been electrically isolated from the electrical load associated with each of the electricity consuming appliances;

a communications interface configured to wirelessly transmit a signal indicative of the detected state of the switch to a controller, the controller being configured to control the electrical load associated with each of the electricity consuming appliances based on at least the detected state of the switch as detected by the sensor and indicated by the wirelessly transmitted signal, wherein control of the electrical load results in the operational status associated with the detected state of the switch; and a power unit configured to provide power to the sensor and the communications interface.

2. The system of claim 1, wherein the power unit is further configured to power a voltage connection to a line terminal of the switch and wherein the sensor detects the state of the switch by detecting an interruption in the voltage connection.

3. The system of claim 1, wherein the switch includes a preexisting wall switch.

4. The system of claim 1, wherein the electrical load includes a lighting fixture.

5. The system of claim 4, wherein the switch includes a momentary contact switch and wherein the controller is further configured to control dimming operations of the light fixture based on the state of the momentary contact switch.

6. The system of claim 1, wherein the electrical load includes an electric motor.

7. The system of claim 1, wherein the adapter is mountable within a switchbox housing the switch.

8. The system of claim 1, wherein the adapter is mountable on the switch.

9. The system of claim 1, wherein the power unit includes a battery.

10. The system of claim 1, wherein the power unit includes a converter.

11. The system of claim 1, wherein the power unit further comprises a photovoltaic cell configured to harvest light energy.

12. A method for remotely controlling one or more electricity consuming appliances, the method comprising:

detecting a state of a switch that has been electrically isolated from an electrical load associated with each of the electricity consuming appliances, the detection being performed by a sensor, wherein the switch is associated with controlling the one or more electricity consuming appliances and wherein the state of the switch is associated with an operational status of the one or more electricity consuming appliances; and transmitting a wireless signal indicative of the detected state of the switch from a transmitter to a controller, the controller controlling the electrical load associated with each of the electricity consuming appliances, the control of the electrical load based on at least the state of the switch as indicated by the signal, wherein control of the electrical load results in the operational status associated with the detected state of the switch.

13. The method of claim 12, wherein the detecting the state of the switch comprises detecting an interrupt signal.

14. The method of claim 12, wherein the electrical load includes a lighting fixture.

15. The method of claim 14, wherein controlling the electrical load comprises turning on or turning off the lighting fixture.

16. The method of claim 14, wherein controlling the electrical load comprises dimming the lighting fixture.

17. A method for adapting a preexisting switch for remote control of one or more electricity consuming appliances, the method comprising:

electrically isolating the preexisting switch from an electrical load associated with each of the electricity consuming appliances, the preexisting switch associated with controlling the one or more electricity consuming appliances, wherein a state of the switch is associated with an operational status of the one or more electricity consuming appliances;

mounting an adapter proximate to the preexisting switch; and configuring the adapter to detect a state of the preexisting switch and to transmit a signal indicative of the detected state to a controller, the controller controlling the electrical load associated with each of the electricity consuming appliances, the control of the electrical load based on at least the state indicated by the signal, wherein control of the electrical load results in the operational status associated with the detected state of the switch.

18. The method of claim 17, wherein electrically isolating the preexisting switch comprises shorting a switched line previously associated with the preexisting switch such that power is continuously supplied to the electrical load.

19. The method of claim 17, wherein configuring the adapter comprises:

connecting a low voltage signal from the power source of the adapter to a line terminal of the preexisting switch; and connecting a sensor from the adapter to a load terminal of the preexisting switch.

* * * * *